US007657716B2

(12) United States Patent
Kroening

(10) Patent No.: US 7,657,716 B2
(45) Date of Patent: Feb. 2, 2010

(54) SAVE AND RESTORE OF A PROTECTED AREA

(75) Inventor: James L. Kroening, Dakota Dunes, SD (US)

(73) Assignee: Gateway, Inc., Poway, CA (US)

( * ) Notice: Subject to any disclaimer, the term of this patent is extended or adjusted under 35 U.S.C. 154(b) by 345 days.

(21) Appl. No.: 10/626,383

(22) Filed: Jul. 24, 2003

(65) Prior Publication Data
US 2005/0021919 A1 Jan. 27, 2005

(51) Int. Cl.
*G06F 12/16* (2006.01)
(52) U.S. Cl. .................. 711/162; 711/173; 707/204
(58) Field of Classification Search .................. None
See application file for complete search history.

(56) References Cited

U.S. PATENT DOCUMENTS

| 6,308,283 | B1 | 10/2001 | Galipeau et al. | |
|---|---|---|---|---|
| 6,363,462 | B1 | 3/2002 | Bergsten | |
| 6,366,987 | B1 | 4/2002 | Tzelnic et al. | |
| 6,430,663 | B1 * | 8/2002 | Ding | 711/162 |
| 6,779,109 | B2 * | 8/2004 | Stevens | 713/1 |
| 6,901,493 | B1 * | 5/2005 | Maffezzoni | 711/162 |
| 7,111,203 | B2 * | 9/2006 | Hu et al. | 714/36 |
| 2002/0107877 | A1 * | 8/2002 | Whiting et al. | 707/204 |
| 2002/0133702 | A1 * | 9/2002 | Stevens | 713/163 |
| 2003/0229768 | A1 * | 12/2003 | Kawano et al. | 711/165 |
| 2004/0243759 | A1 * | 12/2004 | Itoh et al. | 711/112 |

\* cited by examiner

*Primary Examiner*—Matt Kim
*Assistant Examiner*—Kaushikkumar Patel
(74) *Attorney, Agent, or Firm*—Pearne & Gordon LLP

(57) ABSTRACT

A method, apparatus, system, and signal-bearing medium that in an embodiment save a protected area of a storage device by booting to the protected area, copying the contents of the protected area to the user area of the storage device, rebooting to the user area, and then saving the user area to a backup storage device. In another embodiment, a restore mechanism is provided by copying the saved contents of the protected area from the backup storage device to the user area of the storage device, booting into the protected area of the storage device, and copying the saved contents into the protected area. In this way, in various embodiments the contents of the protected area of a storage device can be saved and restored.

19 Claims, 3 Drawing Sheets

SAVE AND RESTORE OF A PROTECTED AREA

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to a protected area of a storage device and more particular to providing a save and restore of the protected area.

BACKGROUND

Electronic devices, such as computers, typically include storage devices (e.g., disk drives), which store data and/or code. Although these storage devices are generally reliable, they have a limited lifetime and sometimes fail. Further, these storage devices can be damaged by fire, water, or other accidents. In addition, the storage devices can become corrupted with viruses, and users occasionally accidentally delete their data or modify their data to an unknown or inconsistent state. To address these potential problems, careful users periodically save the contents of their storage devices to backup storage devices (e.g., other disk drives or tape drives), either directly connected to their electronic devices or indirectly connected, e.g., attached via a network. When disaster strikes, the saved contents can be restored to the electronic device of origin, or a different electronic device if desired.

Although this save and restore procedure works well for the user area of a storage device, which is accessible by the operating system of the electronic device, some modem storage devices contain an area called a HPA (Host Protected Area), which is not accessible by the operating system. An example specification for a HPA was created by the T13 Technical Committee of the Accredited Standards Committee NCITS (National Committee for Information Technology Standards). This specification is known as the Protected Area Run Time Interface Extension Services (PARTIES). PARTIES outlines a technique that reserves and protects an area of a disk drive from the normal user data area. It allows OEM (Original Equipment Manufacturers) and electronic device manufacturers to store utilities, applications, and other data in the HPA area without the worry of virus or user data integrity compromises.

Since the HPA is not accessible by the operating system, the save function of the electronic device does not save the contents of the HPA because the save function uses the operating system. Since the HPA is not saved by normal save operations, it cannot easily be restored when disaster strikes.

SUMMARY

A method, apparatus, system, and signal-bearing medium are provided that in an embodiment save a protected area of a storage device by booting to the protected area, copying the contents of the protected area to the user area of the storage device, rebooting to the user area, and then saving the user area to a backup storage device. In another embodiment, a restore mechanism is provided by copying the saved contents of the protected area from the backup storage device to the user area of the storage device, booting into the protected area, and copying the saved contents into the protected area. In this way, the contents of the protected area of a storage device can be saved and restored.

DETAILED DESCRIPTION

Figure 1:
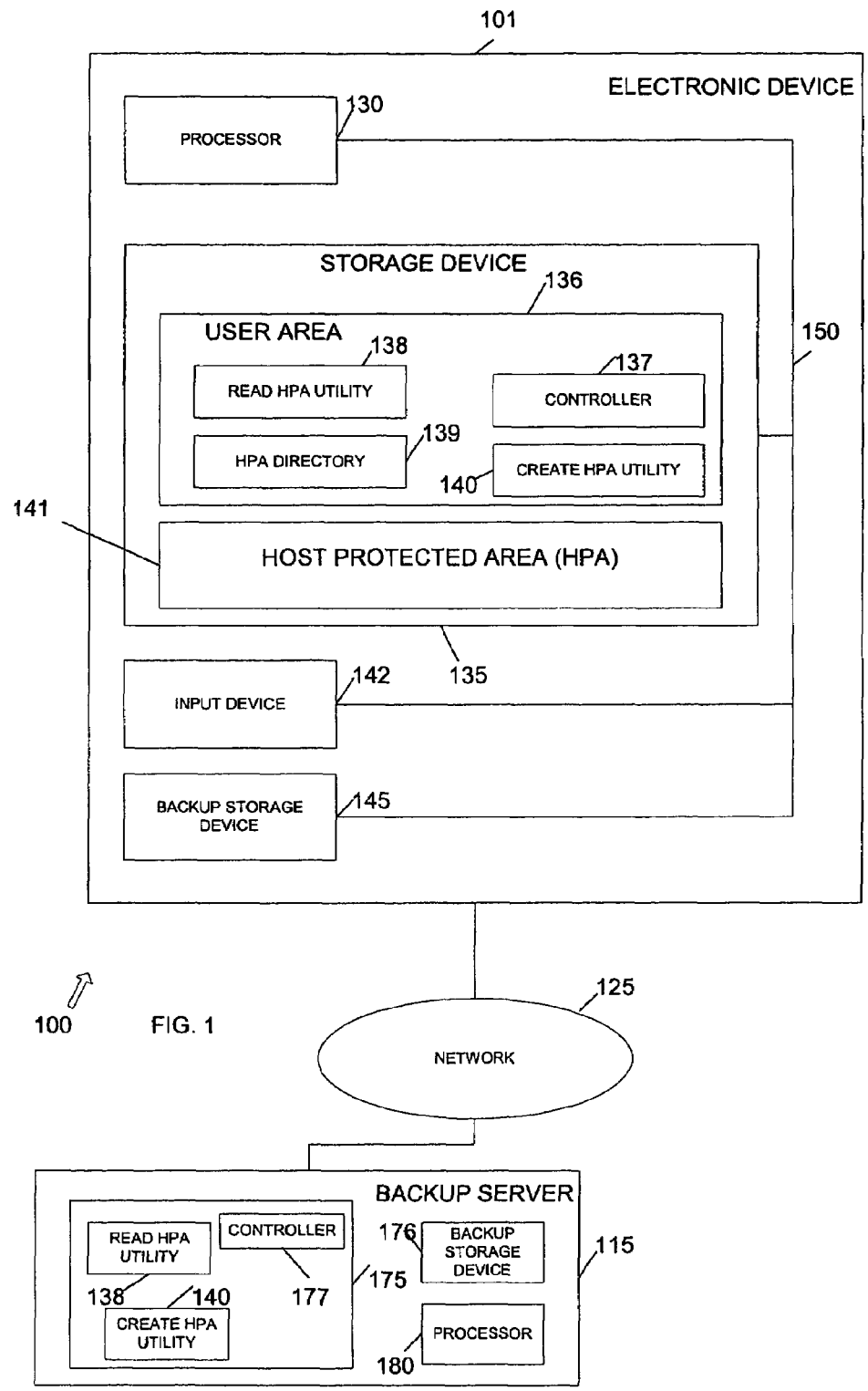
FIG. 1 depicts a block diagram of an example system for implementing an embodiment of the invention.

FIG. 1 depicts a block diagram of an example system 100 for implementing an embodiment of the invention. The system 100 includes an electronic device 101 and a backup server 115 connected via a network 125. Although only one electronic device 101 one backup server 115, and one network 125 are shown, in other embodiments any number or combination of them may be present. In another embodiment, the backup server 115 and/or the network 125 are not present.

The electronic device 101 includes a processor 130, a storage device 135, an input device 142, and a backup storage device 145, all connected via a bus 150.

The processor 130 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 130 executes instructions and includes that portion of the electronic device 101 that controls the operation of the entire electronic device. Although not depicted in FIG. 1, the processor 130 typically includes a control unit that organizes data and program storage in memory and transfers data and other information between the various parts of the electronic device 101. The processor 130 receives input data from the input device 142 and the network 125, reads and stores code and data in the storage device 135, and presents data to the backup storage device 145 and/or the network 125.

Although the electronic device 101 is shown to contain only a single processor 130 and a single bus 150, the present invention applies equally to electronic devices that may have multiple processors and multiple buses with some or all performing different functions in different ways.

The storage device 135 represents one or more mechanisms for storing data. For example, the storage device 135 may include read only memory (ROM), random access memory (RAM), magnetic disk storage media, optical storage media, flash memory devices, and/or other machine-readable media. In other embodiments, any appropriate type of storage device may be used. Although only one storage device 135 is shown, multiple storage devices and multiple types of storage devices may be present. Further, although the electronic device 101 is drawn to contain the storage device 135, it may be distributed across other electronic devices, for example on computers attached to the network 125.

The storage device 135 includes a user area 136 and a host protected area (HPA) 141. Of course, the storage device 135 may also contain additional software and data (not shown), which are not necessary to understanding the invention. The user area 136 is a portion of the storage device 135 that is accessible by the operating and file system (not shown) of the electronic device 101. The HPA 141 is a reserved area for data storage outside the normal operating and file systems. This area is hidden from the operating system and file system, and is normally used for specialized applications.

A computer's operating system does not comprehend the existence of the HPA 141 because, for example, the operating system operates in accordance with the parameters of the set_max command which is typically set to keep the operating system out of this reserved area. As such, a user's access to disk space is dependent on disk topology information provided by the operating system under the constraints of the set_max parameters. Original equipment manufacturers can access and alter the HPA 141 using an OEM password to the IDE hard drive. Users, however, do not have access to the OEM password and therefore cannot access the hidden area, HPA 141. The set_max command is further described in U.S. Pat. No. 5,966,732, issued Oct. 12, 1999, which is hereby incorporated by reference in its entirety. Various aspects of host protected areas are further described in U.S. patent application Ser. No. 09/866,332, filed on May 25, 2001, which is hereby incorporated by reference in its entirety. The '332 patent application and the '732 patent are each assigned to the assignee of the present application.

The user area 136 includes a controller 137, a read HPA utility 138, a HPA directory 139, and a create HPA utility 140. The controller 137, the read HPA utility 138, and a create HPA utility 140 include instructions capable of being executed on the processor 130 to carry out the functions of embodiments of the present invention, as further described below with reference to FIGS. 2 and 3. In another embodiment, some or all of the functions of embodiments of the present invention are carried out via hardware in lieu of a processor-based system.

The HPA directory 139 is created by the read HPA utility 138 during a save process and created by the create HPA utility 140 during a restore process, as further described below with reference to FIGS. 2 and 3, respectively.

The backup storage device 145 is that part of the electronic device 101 that stores the backup contents of the storage device 135. In various embodiments the backup storage device 145 may be a disk drive, diskette drive, tape drive, a writeable CD (compact disk) drive, or a writeable DVD (Digital Video Disk) drive. In another embodiment, the backup storage device 145 may not be present. Although the electronic device 101 is drawn to contain the backup storage device 145, it may be distributed across other electronic devices, for example on computers attached to the network 125.

The bus 150 may represent one or more busses, e.g., PCI, ISA (Industry Standard Architecture), X-Bus, EISA (Extended Industry Standard Architecture), or any other appropriate bus and/or bridge (also called a bus controller).

The electronic device 101 may be implemented using any suitable hardware and/or software, such as a personal computer. Portable computers, laptop or notebook computers, PDAs (Personal Digital Assistants), pocket computers, telephones, pagers, appliances, and mainframe computers are examples of other possible configurations of the electronic device 101. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The backup server 115 includes a storage device 175, a backup storage device 176, and a processor 180. The storage device 175, the backup storage device 176, and the processor 180 may be connected via a bus (not shown) analogous to the bus 150 previously described above.

The storage device 175 is analogous to the storage device 135 previously described above. The storage device 175 includes a read HPA utility 138, a create HPA utility 140, and a controller 177. In an embodiment, the read HPA utility 138 and the create HPA utility 140 include instructions capable of executing on processor 180 to perform functions, as further described below with respect to FIGS. 2 and 3. In another embodiment the read HPA utility 138 and the create HPA utility 140 may be implemented in hardware.

The backup storage device 176 is analogous to the backup storage device 145. Although the storage device 175 and the backup storage device 176 are drawn as separate devices, in another embodiment they may be the same device. The processor 180 is analogous to the processor 130 as previously described above. Although the storage device 175 and the backup storage device 176 are drawn to be included in the backup server 115, in another embodiment one or both may be external to the backup server 115.

The network 125 may be any suitable network or combinations of networks and may support any appropriate protocol suitable for communication between the electronic device 101 and the backup server 115.

As will be described in detail below, aspects of an embodiment pertain to specific apparatus and method elements implementable on a computer or other electronic device. In another embodiment, the invention may be implemented as a program product for use with an electronic device. The programs defining the functions of this embodiment may be delivered to an electronic device via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, including wireless communications.

Such signal-bearing media, when carrying machine-readable instructions that direct the functions of the present invention, represent embodiments of the present invention.

Figure 2:
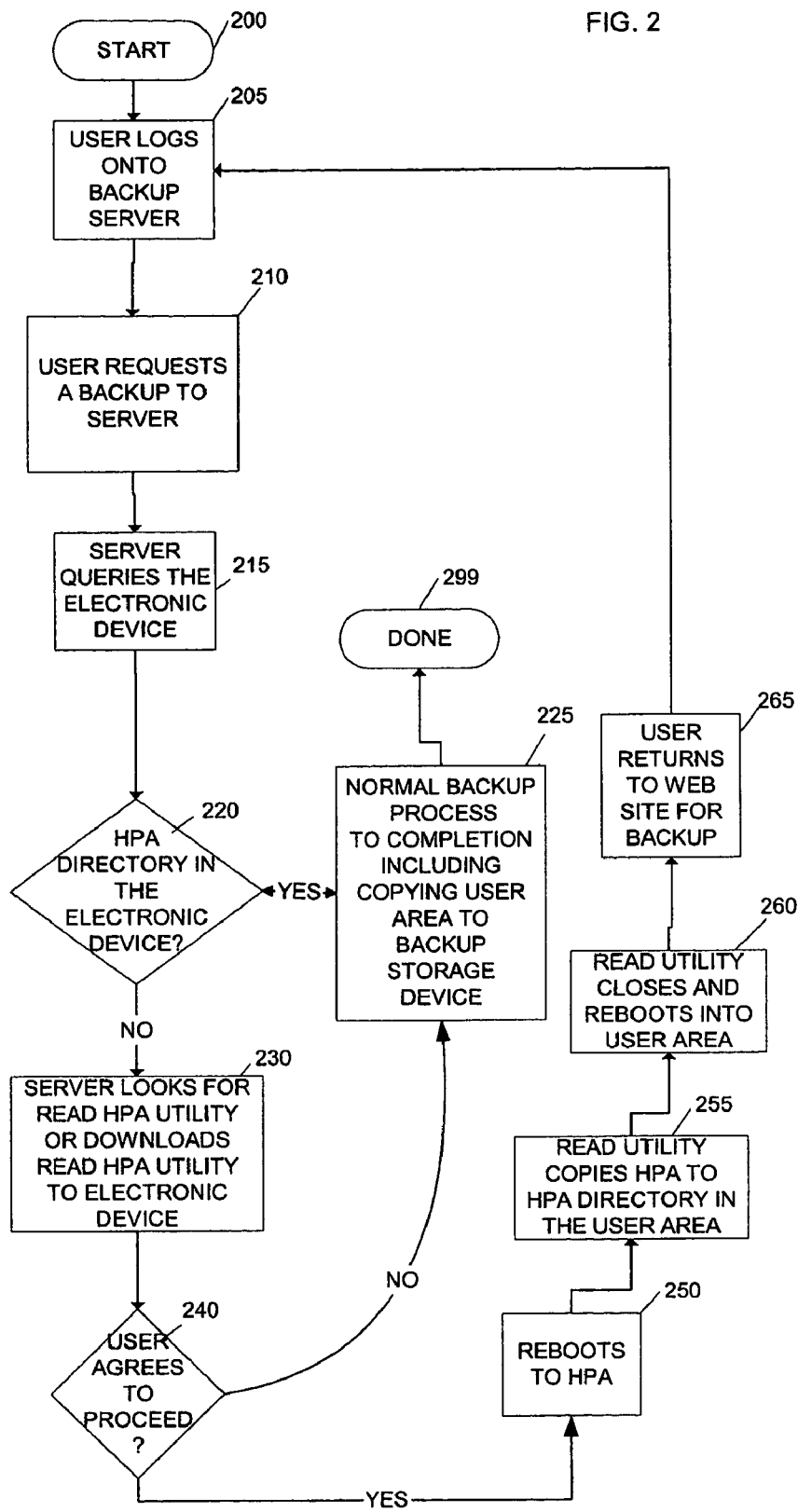
FIG. 2 depicts a flowchart of example save processing, according to an embodiment of the invention.

FIG. 2 depicts a flowchart of example save processing, according to an embodiment of the invention. Control begins at block 200. Control then continues to block 205 where the user of the electronic device 101 logs onto the backup server 115. Control then continues to block 210 where the user requests the backup server 115 to backup or save the contents of the storage device 135. Control then continues to block 215 where the controller 177 queries the electronic device 101 to determine whether the HPA directory 139 exists on the storage device 135. Control then continues to block 220 where the controller 137 determines whether the HPA directory 139 exists on the storage device 135.

If the determination at block 220 is false, then control continues to block 230 where the controller 177 sends a query to the electronic device 101 asking whether the read HPA utility 138 already exists at the electronic device 101. If the read HPA utility 138 does not already exist at the electronic device 101, then the backup server 115 downloads the read HPA utility 138 to the electronic device 101. Control then continues to block 240 where the controller 177 determines whether the user agrees to proceed. If the determination at block 240 is false, then control continues to block 225 where the normal backup process occurs including copying the user area 136 to the backup storage device 176.

If the determination at block 240 is true, then control continues to block 250 where the create HPA utility 140 reboots the electronic device 101 to the HPA 141. In an embodiment, the read HPA utility 140 tells the electronic device 101 that the HPA 141 is drive A. Control then continues to block 255 where the read HPA utility 138 copies the HPA 141 to the HPA directory 139. Control then continues to block 260 where the read HPA utility 138 reboots the electronic device 101 to the user area 136.

Control then continues to block 265 where the user returns to the backup server 115. Control then returns to block 205 where the user logs onto the backup server 115. Control then continues to block 210 where the user requests a backup. Control then continues to block 215 where the controller 177 at the server 115 queries the electronic device 101. Control then continues to block 220 where the controller 137 determines whether the HPA directory 139 exists in the electronic server 101. Since the HPA 141 was previously copied to the HPA directory 139 at block 255, the determination at block 220 is true, so control continues to block 225 where a normal backup process of the user area 136 is performed, including copying the HPA directory 139 to the backup storage device 176. Control then continues to block 299 where the process completes.

Although the processing for FIG. 2 has been described in the context of saving the contents of the storage device 135 to the backup storage device 176 using the backup server 115, in another embodiment the read HPA utility 138 may be pre-existing in the storage device 135 and may save the contents of the storage device 135 to the backup storage device 145 without using the backup server 115.

Figure 3:
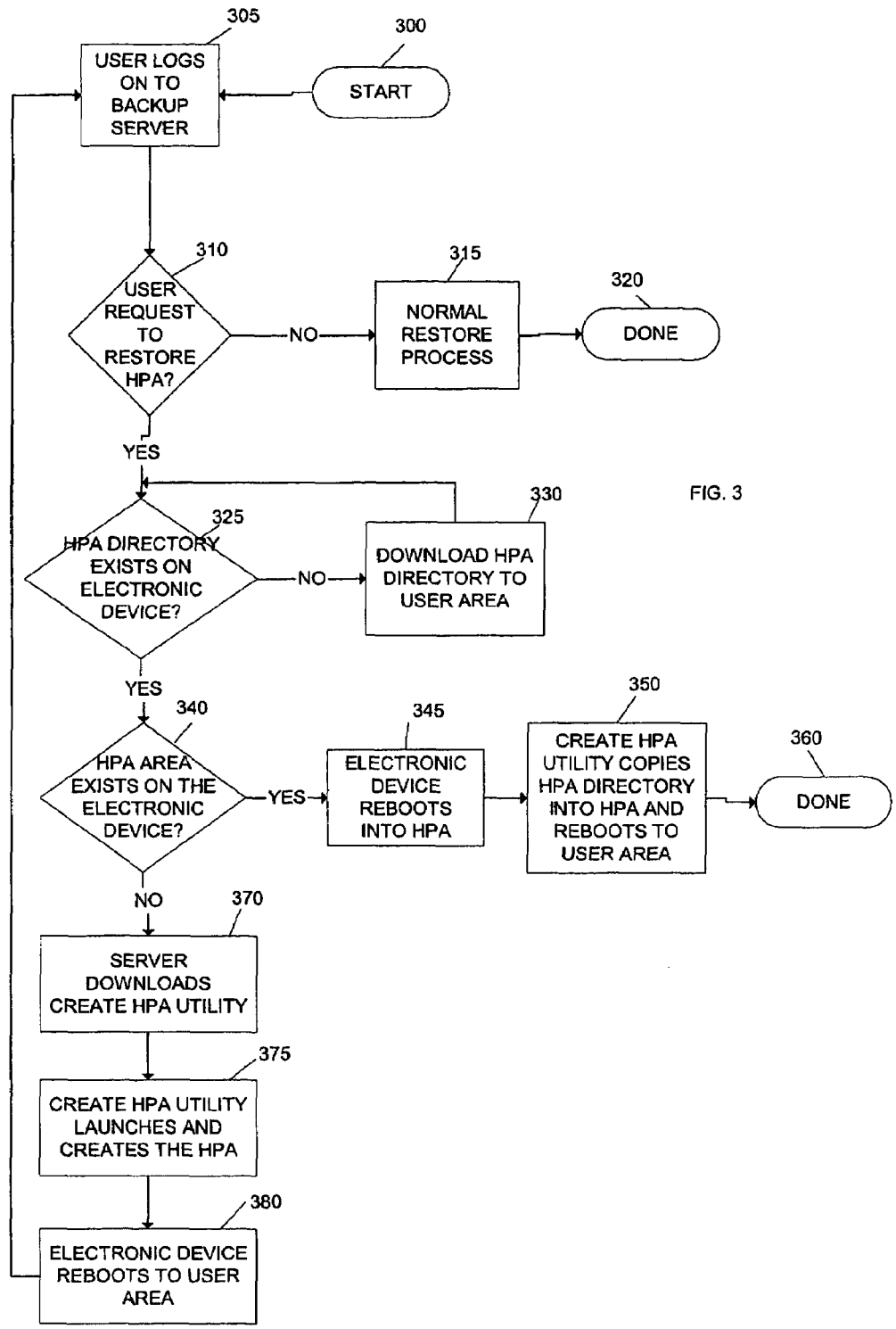
FIG. 3 depicts a flowchart of example restore processing, according to an embodiment of the invention.

FIG. 3 depicts a flowchart of example restore processing, according to an embodiment of the invention. Control begins at block 300. Control then continues to block 305 where the user logs into the backup server 115. Control then continues to block 310 where the controller 177 determines whether the user requests to restore the HPA 141. If the determination at block 310 is false, then control continues to block 315 where the normal restore process is performed. Control then continues to block 320 where the process completes.

If the determination at block 310 is true, then control continues to block 325 where the controller 177 sends a request to the electronic device 101. In response to the request, the controller 137 determines whether the HPA directory 139 exists on the storage device 135 and responds to the request. If the determination at block 325 is false, then control continues to block 330 where the controller 177 downloads the HPA directory 139 from the backup storage device 176 to the storage device 135 at the electronic device 101. The HPA directory 139 was previously saved to the backup storage device 176 as described above with reference to FIG. 2.

Control then continues to block 325 where the determination is now true, so control continues to block 340 where the controller 137 determines whether the HPA 141 exists on the storage device 135. In an embodiment, the controller 137 makes the determination by reading a register in the storage device controller to see if the maximum size of the storage device 135 has been set. If the determination at block 340 is false, then control continues to block 370 where controller 177 downloads the create HPA utility 138 from the backup server 115 to the electronic device 101. Control then continues to block 375 where the create HPA utility 138 launches and, in an embodiment, sets the maximum size of the storage device 135, so that the HPA 141 is created. Control then continues to block 380 where the electronic device 101 reboots to the user area 136. Control then returns to block 305, as previously described above.

When the determination at block 340 is true, then control continues from block 340 to block 345 where the electronic device 101 reboots into the HPA 141. Control then continues to block 350 where the create HPA utility 138 in the user area 136 (previously created at block 370) copies the HPA directory 139 into the HPA 141 and reboots to the user area 136. Control then continues to block 360 where the process completes.

Although the processing for FIG. 3 has been described in the context of restoring the contents of HPA 141 from the backup storage device 176 to the storage device 135, in another embodiment the create HPA utility 400 pre-exist in the storage device 135 and may restore the HPA 141 from the backup storage device 145 without using the backup server 115.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. However, it is understood that the invention may be practiced without these specific details. In other instances, well-known circuits, structures, and techniques have not been shown in detail in order not to obscure the invention.

What is claimed is:

1. A method of saving and restoring of a protected area comprising:
   booting to the protected area of a first storage device;
   after said booting, copying contents of the protected area of the first storage device to a user area of the first storage device;
   rebooting to the user area of the first storage device;
   after said rebooting, saving the user area to a second storage device, the user area comprising user accessible contents and the copied contents of the protected area; and
   after said saving, restoring the copied contents of the protected area from the second storage device to the protected area of the first storage device.

2. The method of claim 1, further comprising:
   downloading a utility, wherein the utility performs the copying.

3. The method of claim 1, wherein the second storage device is attached to a backup server.

4. The method of claim 1, wherein the second storage device is configured as part of an electronic device connected to the first storage device.

5. The method of claim 1, wherein said copying further comprises:
   copying the contents of the protected area of the first storage device to a directory designated for the protected area in the user area of the first storage device.

6. The method of claim 1, wherein the step of restoring comprises:
copying a protected area directory containing the copied contents from the second storage device to the user area of the first storage device;
after said copying the protected area directory, booting to the protected area of the first storage device; and
after said booting, restoring the protected area directory from the user area of the first storage device to the protected area of the first storage device.

7. The method of claim 6, further comprising:
creating the protected area on the first storage device before said copying the protected area directory.

8. A machine readable storage medium bearing instructions that, upon being executed, comprise:
booting to a protected area of a first storage device;
after said booting, copying contents of the protected area of the first storage device to a user area of the first storage device;
rebooting to the user area of the first storage device;
after said rebooting, saving the user area to a second storage device, the user area comprising user accessible contents and the copied contents of the protected area; and
after said saving, restoring the copied contents of the protected area from the second storage device to the protected area of the first storage device.

9. The machine readable storage medium of claim 8, further comprising:
downloading a utility, wherein the utility performs the copying.

10. The machine readable storage medium of claim 8, said restoring further comprising:
copying a protected area directory containing the copied contents from the second storage device to the user area of the first storage device;
after said copying the protected area directory, booting to the protected area of the first storage device; and
after said booting, restoring the protected area directory from the user area of the first storage device to the protected area of the first storage device.

11. The machine readable storage medium of claim 10, further comprising:
creating the protected area on the first storage device before said copying the protected area directory.

12. An electronic device comprising:
a first storage device configured to store first contents in a protected area, store a copy of said first contents in a user area, and store second contents in the user area outside a directory designated for said first contents;
a processor configured to boot to either the user area of the first storage device or the protected area of the first storage device; and
communication means for communicating data to and from a second storage device;
wherein the storage device comprises stored instructions, which upon being executed by the processor, cause the electronic device to perform actions comprising:
booting to the protected area of the first storage device;
after said booting, copying contents of the protected area of the first storage device to the directory designated for said first contents within the user area of the first storage device;
rebooting to the user area of the first storage device;
after said rebooting, saving the user area to the second storage device via the communication means, the user area comprising the copy of said first contents and said second contents; and
after said saving, restoring the copied contents of the protected area from the second storage device to the protected area of the first storage device.

13. The electronic device of claim 12, wherein one or more of the instructions are downloaded from the second storage device, the second storage device being a backup server; and
wherein the communication means connecting the second storage device is a network connection.

14. The electronic device of claim 12, wherein the instructions further comprise:
copying a protected area directory containing the copied contents from the second storage device to the user area of the first storage device;
after said copying the protected area directory, booting to the protected area of the first storage device; and
after said booting, restoring the protected area directory from the user area of the first storage device to the protected area of the first storage device.

15. The electronic device of claim 14, wherein the instructions further comprise:
creating the protected area on the first storage device before said copying the protected area directory.

16. A backup server comprising:
a backup storage device;
a read utility to be downloaded to and executed at an electronic device,
wherein the read utility is configured to perform the steps of:
booting to a protected area of a storage device attached to the electronic device;
after said booting, copying contents of the protected area of the storage device attached to the electronic device to a directory in a user area of the storage device;
rebooting to the user area of the storage device;
after said rebooting, saving a backup copy of the directory to the backup storage device;
a controller configured to download data,
wherein the controller is configured to download the directory from the backup storage device to the user area of the storage device; and
a create utility to be downloaded and executed at the electronic device,
wherein the create utility is to create the protected area on the storage device and copy the directory into the protected area after said downloading.

17. A method in a backup server of creating a backup copy of data from a first storage device, the method comprising:
downloading a read utility to the first storage device;
wherein the read utility is configured to perform instructions comprising:
booting to a protected area of the first storage device;
after said booting, copying contents of the protected area of the first storage device to a user area of the first storage device;
rebooting to the user area of the first storage device; and
after said rebooting, saving a backup copy of the user area of the first storage device to a second storage device;
creating a directory designated for the protected area of the first storage device;
saving the backup copy of the user area of the first storage device to the second storage device, the user area comprising user accessible contents and copied contents of the protected area, wherein the copied contents of the protected area are saved in the directory designated for the protected area of the first storage device; and after said saving, restoring the copied contents of the protected area to the protected area of the first storage device.

18. The method of claim 17, said restoring further comprising:

copying a protected area directory containing the copied contents from the second storage device to the user area of the first storage device; and after said copying the protected area directory, booting to the protected area of the first storage device;

after said booting, restoring the protected area directory from the user area of the first storage device to the protected area of the first storage device.

19. The method of claim 18, further comprising:

creating the protected area on the first storage device before said copying the protected area directory.

* * * * *